(12) United States Patent
Patel et al.

(10) Patent No.: US 6,372,821 B1
(45) Date of Patent: Apr. 16, 2002

(54) LOW VOC (VOLATILE ORGANIC COMPOUNDS), DIMETHYL-2-PIPERIDONE SOLVENT-BASED, PVC AND CPVC PIPE AND COMPONENT ADHESIVES AND PRIMERS CONTAINING MINIMAL OR NO TETRAHYDROFURAN

(75) Inventors: Naresh D. Patel, Northridge, CA (US); Edward D. Otremba, Orchard Park, NY (US); Rashid H. Siddiqi, South Pasadena, CA (US)

(73) Assignee: IPS Corporation, Gardena, CA (US)

( * ) Notice: Subject to any disclaimer, the term of this patent is extended or adjusted under 35 U.S.C. 154(b) by 0 days.

(21) Appl. No.: 09/651,824

(22) Filed: Aug. 30, 2000

Related U.S. Application Data

(63) Continuation-in-part of application No. 09/255,970, filed on Jan. 5, 1999, now abandoned.

(51) Int. Cl.[7] .............................. C08J 9/32; C08K 5/34; C08K 5/07; C08L 27/00
(52) U.S. Cl. ........................ 523/219; 524/99; 524/356; 524/527; 524/567
(58) Field of Search ........................... 523/218; 524/99, 524/356, 527, 567

(56) References Cited

U.S. PATENT DOCUMENTS

| | | | |
|---|---|---|---|
| 4,675,354 A | 6/1987 | Sperling | 524/99 |
| 4,687,798 A | 8/1987 | King | 524/100 |
| 5,384,345 A | 1/1995 | Naton | 523/218 |
| 5,422,388 A | 6/1995 | Patel et al. | 524/104 |
| 5,470,894 A | 11/1995 | Patel et al. | 523/218 |
| 5,817,708 A | 10/1998 | Congelio et al. | 524/104 |
| 5,821,289 A | 10/1998 | Congelio et al. | 524/104 |

OTHER PUBLICATIONS

DuPont Nylon Intermediates and Specialties, Material Safety Data Sheet, H–16147–2.

*Primary Examiner*—Patrick D. Niland
(74) *Attorney, Agent, or Firm*—David W. Collins

(57) ABSTRACT

Novel low VOC solvent-based adhesives are provided, comprising a mixture of low vapor pressure, isomeric dimethyl-2-piperidones (DMPD) blended with (1) a non-solvent diluent, specifically, acetone (a VOC-exempt compound), or with mixtures of acetone and other known ketonic solvents such as methyl ethyl ketone (MEK), diethyl ketone (DEK), methyl propyl ketone (MPK), and methyl iso-butyl ketone (MIBK), cyclohexanone, and (2) thermoplastic PVC or CPVC resins. Omission of the resin provides a novel primer for pipes. The blended mixture yields PVC or CPVC pipe adhesives and primers that: (1) result in low VOC formulas (e.g., less than 510 g/l for PVC pipe and less than 490 g/l for CPVC pipe); (2) are very economical in the industry; (3) yield strong, quick setting, durable pipe joints that meet the required standards and performance criteria (e.g., ASTM D-2564 lap shear for PVC); (4) yield stable, low viscosity solutions that, in the case of adhesives, can be readily adjusted with thixotropes (e.g., Aerosil 200) to give desirable flow characteristics and body, as well as primers for solvent welding PVC and CPVC pipe and components; and (5) can be formulated with minimal (10 wt %) or no cyclic ethers such as THF.

25 Claims, No Drawings

LOW VOC (VOLATILE ORGANIC COMPOUNDS), DIMETHYL-2-PIPERIDONE SOLVENT-BASED, PVC AND CPVC PIPE AND COMPONENT ADHESIVES AND PRIMERS CONTAINING MINIMAL OR NO TETRAHYDROFURAN

CROSS-REFERENCE TO RELATED APPLICATION

The present application is a continuation-in-part application of Ser. No. 09/255,970, filed on Jan. 5, 1999; now abandoned.

TECHNICAL FIELD

The present invention relates generally to thermoplastic pipe adhesive and primer compositions, and, more particularly, to adhesives and primers used for joining PCV (polyvinyl chloride) and CPVC (chlorinated PVC) pipe. Specifically, the PVC and CPVC pipe adhesives and primers disclosed and claimed herein are solvent-based, having an environmentally-acceptable VOC (volatile organic compounds) content.

BACKGROUND ART

Solvent-based adhesives, or cements, have been in use for joining thermoplastic pipe for over 30 years. The development of these adhesives is largely responsible for growth of the thermoplastic pipe industry. Several billion pounds of plastic pipe are produced each year in North America. Rapid-setting, solvent-based adhesives weld the pipes together in a timely manner. These rapid-setting adhesives allow for the testing and trouble-shooting of piping systems in a matter of hours while maintaining the long-term durability of the pipe itself. These characteristics, rapid set, ease of use, long-term durability along with low-cost, have made the joining of plastic pipe by solvent-based adhesives a practical and economic system.

The solvent-based adhesives work primarily by two means of action. First, the solvent portion of the formulation softens the outer surfaces of the pipe through solvation of the plastic. Subsequently, the adhesive joint "cures" (hardens) by means of the solvents evaporating to the surrounding atmosphere from the pipe. Secondly, the resin dissolved in the adhesive dries through solvent evaporation and provides continuity between the welded pipe surfaces which aid in preserving the integrity of the entire pipe system.

These adhesives cure rapidly (within a matter of hours), often allowing piping systems to be tested the same day as constructed. However, perhaps the most important benefit of these solvent-based adhesives is the maintenance of the integrity of the pipe itself. The resin is the same as the plastic pipe and/or fitting material. This provides a high degree of long-term durability for the piping system, often up to 30 to 40 years of useful life. This is essential for these systems which are built into the structures of homes and buildings, or are buried underground.

Thousands of miles of thermoplastic piping systems are constructed each day throughout the world, primarily by the means previously described. These systems are used in the transfer of potable water for drinking; residential hot and cold water systems; drain, waste, and vent (DWV) applications in home and industry; turf and agricultural sprinkler systems; jacuzzi, spa and tub connections, residential and commercial fire sprinkler systems; etc. These systems are crucial to the maintenance of safe and healthy means of transport of water and other chemicals throughout the world.

Evaporation of solvents from adhesives is a concern to an environmentally-concerned world, along with all other potential sources of air pollution. Typical solids (non-volatile) contents of plastic pipe adhesives are 10 to 20% for both PVC and CPVC. The balance of the formulation is solvent. By definition, the solvents normally used, e.g., tetrahydrofuran (THF), methyl ethyl ketone (MEK), and acetone are considered to be VOCs. That is, they are volatile compounds which contain the element carbon excluding methane, carbon monoxide, carbon dioxide, carbonic acid, metallic carbides and carbonates, ammonium carbonate, and exempt compounds, such as methylene chloride and 1,1,1-trichlorethane. While other solvents, such as cyclohexanone and dimethyl formamide (in the case of PVC) and cyclohexanone (in the case of CPVC), may also be used in such adhesives, the amount of such solvents are typically minor, considerably less than 15 wt % (in the case of PVC) and 10 wt % (in the case of CPVC) of the total adhesive concentration. Typical VOC values of present commercial PVC solvent adhesives range from 750 to 850 grams/liter and for CPVC solvent adhesives range from 775 to 850 g/l.

Regulations are being created throughout North America regarding allowable VOC levels in adhesive formulations. Federal, state, and local agencies are beginning to adopt strict measures to drastically reduce these levels. The South Coast Air Quality Management District (SCAQMD) in the Los Angeles area has been a leader of the establishment of rules governing VOCs, such as SCAQMD Rule 1168.

SCAQMD Rule 1168 specifies a VOC level for PVC adhesives of 510 g/l or less and for CPVC adhesives of 490 g/l or less, as determined by Method 316-A. All PVC and CPVC adhesives used after Jan. 24, 1994, are required to meet that maximum allowed level.

More recently, acetone has been removed from the list of solvents and placed on the list of exempt solvents. Consequently, there is, at the present time, no legal limit to the amount of acetone that can be added to adhesive compositions.

Further, tetrahydrofuran (THF), which has been a major component of PVC and CPVC adhesive compositions (typically, 25 to 75 wt %), has been found by the National Toxicology Board to have a slight carcinogenicity in animal testing. As a result, THF is under extensive investigation, both with regard to worker health (exposure during pipe assembly) and potable water issues. Furthermore, THF is a high vapor pressure, fast-evaporating solvent that heavily contributes to the VOC level. It is highly desirable to reduce THF levels, but still maintain the adhesive-contributing properties that THF offers, i.e., fast-setting, durable pipe joints.

Also, many PVC and CPVC pipe adhesives are formulated with N-methyl pyrrolidone (NMP), a very effective solvent for PVC and CPVC resins. However, the hygroscopicity of this solvent results in milky white cured film joints, even in pigmented blue and gray formulas, and this is undesirable in many applications.

Other thermoplastic pipe adhesives are formulated with large amounts of low vapor pressure solvents blends, such as di-methyladipate (available from E. I. DuPont de Nemours as DBE-6) and NMP and/or alkyl-substituted naphthalene (U.S. Pat. No. 5,821,289, issued to C. D. Congelio et al) to reduce VOC levels, but generally these type of adhesives require longer set times before water pressure testing of the system can be made. Also, these slower setting adhesives are less effective in colder environments.

Still another method to formulate low VOC cements for thermoplastic pipe and other PVC and CPVC extruded articles is to incorporate higher amounts of resin(s). This does indeed reduces VOC levels, but is less cost effective and generally slower than cements containing lower weight percent of resin.

Thus, adhesives for joining PVC and CPVC pipes having a maximum VOC level of 510 g/l (for PVC) or 490 g/l (for CPVC) are required. Yet, such adhesive must also meet the required hydrostatic burst strength and other performance criteria set forth in ASTM F-493 and D-2846 and lap shear strength set forth in ASTM D-2564. (Test method 316A has been revised and the new acceptable VOC levels are shown above.)

DISCLOSURE OF INVENTION

In accordance with the present invention, novel low VOC solvent-based adhesives are provided, comprising a mixture of low vapor pressure isomeric dimethyl-2-piperidones (DMPD) blended with (1) a non-solvent diluent, specifically, acetone (a VOC-exempt compound), or with mixtures of acetone and other known ketonic solvents such as methyl ethyl ketone (MEK), diethyl ketone (DEK), methyl propyl ketone (MPK), and methyl iso-butyl ketone (MIBK), cyclohexanone, and (2) thermoplastic PVC or CPVC resins. Primers are also provided in accordance with the present invention by omitting the inclusion of the thermoplastic resin.

The novel adhesives described herein overcome the deficiencies described above for the prior art adhesives without compromising adhesive performance. The adhesives of the present invention comprise (for joining PVC pipes and components):

(a) about 5 to 25 wt % PVC resin and 0 to about 25 wt % acrylic resin, the total of PVC resin and acrylic resin ranging from about 10 to 35 wt %;

(b) about 5 to 80 wt % of low vapor pressure dimethyl-2-piperidone (DMPD);

(c) about 10 to 75 wt % of at least one ketone selected from the group consisting of (i) 0 to 75 wt % acetone, (i) 0 to about 75 wt % of at least one low boiling point ketone having a boiling point below 80°, (iii) 0 to about 35 wt % of at least one medium boiling point ketone having a boiling point within a range of 80° to 130° C., (iv) 0 to about 35 wt % of at least one high boiling point ketone having a boiling point greater than 130° C., with the proviso that the total of the medium and high boiling point ketones is a maximum of 35 wt % of the adhesive or primer composition; and (d) 0 to about 10 wt % tetrahydrofuran.

For joining CPVC pipes and components, the foregoing composition is modified only by replacing the resin component in (a) with about 5 to 25 wt % CPVC resin.

Inclusion of the resin component provides pipe adhesives, while omission of the resin component provides pipe primers.

DMPD, which is used in the novel adhesive of the present invention, is a true solvent for PVC and CPVC and exhibits a remarkable decrease in solution viscosity when blended with the non-solvent acetone or the other ketones (such as methyl ethyl ketone, diethyl ketone, methyl propyl ketone, cyclohexanone, methyl iso-butyl ketone, methyl amyl ketone, acetophenone, methyl iso-propyl ketone, methyl butyl ketone, methyl iso-amyl ketone, di-butyl ketone, ethyl amyl ketone, etc.), thereby allowing great latitude in formulation. Blends of DMPD can be adjusted for such parameters as set time, VOC content, cost, viscosity, flash point, solids content very readily with little effect on adhesive performance.

The adhesive in this invention may include filler, thixotropic agents, colorants, stabilizers, oligomeric and polymeric rheology additives, wetting agents and adhesion promoters.

The blended mixture yields PVC or CPVC pipe adhesives that:

(1) result in low VOC formulas (e.g., less than 510 g/l for PVC pipe and less than 490 g/l for CPVC pipe);

(2) are very economical in the industry;

(3) yield strong, quick setting, durable pipe joints that meet the required standards and performance criteria (e.g., ASTM D-2564 lap shear for PVC);

(4) yield stable, low viscosity solutions that can be readily adjusted with thixotropes (e.g., Aerosil 200) to give medium and high body adhesives, as well as low bodied adhesives and primers for solvent welding PVC and CPVC pipe and components; and (5) can be formulated with minimal (10 wt % maximum) or no cyclic ethers such as THF.

Other objects, features, and advantages of the present invention will become apparent upon consideration of the following detailed description.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

In accordance with the present invention, novel low VOC solvent-based adhesives are provided, comprising a mixture of low vapor pressure isomeric dimethyl-2-piperidones (DMPD) blended with (1) (a) a non-solvent diluent, specifically, acetone (a VOC-exempt compound), or (b) with mixtures of acetone and other known ketonic solvents such as methyl ethyl ketone (MEK), diethyl ketone (DEK), methyl propyl ketone (MPK), methyl iso-butyl ketone (MIBK), methyl amyl ketone (MAK), and cyclohexanone, or (c) with one or more of the foregoing ketonic solvents without acetone, and (2) thermoplastic PVC or CPVC resins.

The novel adhesives described herein overcome the deficiencies described above for the prior art adhesives without compromising adhesive performance. The adhesives of the present invention comprise (for joining PVC pipes and components):

(a) about 5 to 25 wt % PVC resin and 0 to about 25 wt % acrylic resin, the total of PVC resin and acrylic resin ranging from about 10 to 35 wt %;

(b) about 5 to 80 wt % of low vapor pressure dimethyl-2-piperidone (DMPD);

(c) about 10 to 75 wt % of at least one ketone selected from the group consisting of (i) 0 to 75 wt % acetone, (i) 0 to about 75 wt % of at least one low boiling point ketone having a boiling point below 80° ,(iii) 0 to about 35 wt % of at least one medium boiling point ketone having a boiling point within a range of 80° to 130° C., (iv) 0 to about 35 wt % of at least one high boiling point ketone having a boiling point greater than 130° C., with the proviso that the total of the medium and high boiling point ketones is a maximum of 35 wt % of the adhesive or primer composition; and (d) 0 to about 10 wt % tetrahydrofuran.

For joining CPVC pipes and components, the foregoing composition is modified only by replacing the resin component in (a) with about 5 to 25 wt % CPVC resin.

Inclusion of the resin component provides pipe adhesives, while omission of the resin component provides pipe primers.

Unless otherwise specified, the concentration of a particular component is with respect to the total adhesive or primer composition. The purity of all components is that employed in normal commercial practice in the field of PVC and CPVC adhesives and primers for joining pipes and other components together.

DMPD, which is used in the novel adhesive of the present invention, is a true solvent for PVC and CPVC and exhibits a remarkable decrease in solution viscosity when blended with the non-solvent acetone or the other ketones (such as methyl ethyl ketone, diethyl ketone, methyl propyl ketone, cyclohexanone, methyl iso-butyl ketone, methyl amyl ketone, acetophenone, methyl iso-propyl ketone, methyl butyl ketone, methyl iso-amyl ketone, di-butyl ketone, ethyl amyl ketone, etc.), thereby allowing great latitude in formulation. Blends of DMPD can be adjusted for such parameters as set time, VOC content, cost, viscosity, flash point, solids content very readily with little effect on adhesive performance. There are a number of isomers of DMPD, including 1,3-dimethyl piperidone, 1,4-dimethyl piperidone, 1,5-dimethyl piperidone, 2,3-dimethyl piperidone, 2,4-dimethyl piperidone, and 2,5-dimethyl piperidone, all of which alone or in any combination are useful in the practice of the present invention. One product that is commercially available comprises a mixture containing 64 to 71 wt % of 1,3-dimethyl piperidone and 29 to 36 wt % of 1,5-dimethyl piperidone and is available from E. I. du Pont de Nemours (Wilmington, Del.).

In general, acetone may be employed as the sole ketone in the range of about 15 to 75 wt % of the total adhesive or primer composition. Alternatively, a mixture of acetone and at least one of the other above-enumerated ketones may be employed, the total concentration falling within the same range. Finally, at least one of the enumerated ketones, other than acetone, may be used in the practice of the present invention.

In particular, the ketone component comprises about 10 to 75 wt % of the total adhesive or primer composition and is at least one ketone selected from the group consisting of (1) 0 to about 75 wt % acetone; (2) 0 to about 75 wt % of at least one low boiling ketone having a boiling point less than 80° C., such as methyl ethyl ketone (MEK); (3) 0 to 35 wt % of at least one medium boiling ketone having a boiling point within a range of about 80° to 130° C., such as diethyl ketone (DEK), methyl propyl ketone (MPK), methyl iso-propyl ketone (MIPK), methyl iso-butyl ketone (MIBK), and methyl n-butyl ketone (MBK); and (4) 0 to about 35 wt % of at least one high boiling ketone having a boiling point greater than 130° C., such as cyclohexanone, acetophenone, methyl amyl ketone, methyl iso-amyl ketone, di-iso-ketone, and ethyl amyl ketone, wherein the medium boiling ketone and the high boiling ketone have a total maximum combined amount of 35 wt %. It will be evident to those skilled in this art that if, for example, no acetone is selected, then a suitable amount of another ketone or ketones must be added to provide at least 10 wt % ketone in the adhesive or primer composition, within the constraints listed above.

With regard to the PVC resin, its incorporation into the adhesive composition provides an adhesive for PVC pipe. In addition, acrylic resins may be included, as disclosed in U.S. Pat. No. 5,422,388, issued to Naresh D. Patel et al on Jun. 6, 1995. The acrylic resin, if employed, may comprise any combination of the known homopolymers, copolymers, and terpolymers commonly employed in adhesive compositions.

The concentration of PVC resin is in the range of about 5 to 25 wt % of the total adhesive composition.

The acrylic resin, if employed, is preferably in the range of about 2 to 25 wt %, with the concentration of the mixture of both PVC and acrylic resin ranging from about 10 to 35 wt % of the adhesive composition. (A minimum of 10 wt % resin is permitted under ASTM-2564.) A concentration of PVC beyond the maximum value of 25 wt % would not be shelf-stable. With regard to the acrylic resin, less than about 2 wt % does not result in the benefits provided to the adhesive by its presence in combination with the PVC resin, while greater than about 25 wt % is not soluble in the solvent system. Within the foregoing constraints, the total resin level in the PVC adhesive ranges from about 10 to 35 wt %, as indicated above. Less than about 10 wt % makes it difficult to achieve VOC levels (if formulated without acetone or significant levels of DMPD) less than the permitted maximum of 510 g/l, while greater than about 35 wt % is not shelf-stable.

Any of the PVC resins commonly employed in PVC adhesives may be used in the practice of the present invention. Particularly preferred are those PVC resins characterized by homopolymers as classified by inherent viscosity (I.V.) in the range of about 0.6 to 0.95. The inherent viscosity of a PVC resin is determined in accordance with ASTM D-1243. Inherent viscosity is a qualitative measure of molecular weight; that is, the higher the I.V., the higher the molecular weight. A non-limiting example of a suitable PVC resin employed in the practice of the present invention is Shintech SE-650, available from Shintech, Inc. (Freeport, Tex.).

The acrylic resins advantageously employed in the practice of the present invention are those homopolymers, copolymers, and terpolymers of methyl methacrylate. When characterized by inherent viscosity, as measured with a solution containing 0.25 g polymer in 50 ml methylene chloride at 20° C. using a No. 50 Cannon-Fenske Viscometer, the useful range in the practice of the present invention is 0.1 to 1.25. Alternatively, an acrylic resin having a melt flow rate as determined by ASTM D-1238 in the range of 1.6 to 24 is acceptable. Examples of acrylic resins suitably employed in the practice of the present invention include (1) the V series (VS, VM, VH) resins from Atohaas, (2) the Elvacite® and Lucite® acrylic resins, both available from ICI, and (3) Acriterm® HS resins from ICI.

With regard to the CPVC resin, its incorporation into the adhesive composition provides an adhesive for CPVC pipe. As indicated above, the CPVC resin is contained in the adhesive formulation in an amount ranging from about 5 to 25 wt %, preferably from about 5 to about 15 wt % of the total adhesive. If too small an amount of CPVC resin is used, it may not be possible to form an effective and durable pipe joint and VOC levels will tend to increase, while, if the amount of CPVC resin too great, it may not all solubilize in the solvent(s) and thus tends to form an undesirable "gel" therewith.

CPVC resins useful in this invention may be prepared by chlorination of polyvinyl chloride homopolymers and copolymers starting materials by procedures known to those skilled in the art. Examples of useful polyvinyl chloride homopolymers and copolymers starting materials in this regard include those described in U.S. Pat. No. 5,384,345, which teachings are incorporated herein by reference. CPVC resins are typically supplied in powder form when obtained from commercial sources. The CPVC resins used in this invention may contain chlorine in any amount effective to impart adequate heat deflection resistance property to the adhesive composition for the intended use(s). The chlorine content of the CPVC resins used in the compositions of this invention will range from about 50 to about 80% by weight, and more specifically about 57 to about 70% by weight.

Particularly preferred are those CPVC resins characterized by an inherent viscosity (I.V.) ranging from about 0.60 to 0.95, and more preferably about 0.68 to about 0.92. A non-limiting example of a suitable CPVC resin employed in the practice of the present invention is BF Goodrich Temprite 677×670 with 67% chlorination, available from BF Goodrich (Cleveland, Ohio).

The adhesives of the present invention may include additional solids. Such additional solids that may be present include fillers, thixotropic agents, colorants, stabilizers, oligomeric and polymeric rheology additives, wetting agents, and adhesion promoters. Up to about 8 wt % of the adhesive may contain such additional additives and adjuvants. Any fillers, thixotropic agents, pigments, dyes, stabilizers oligomeric and polymeric rheology additives, wetting agents, and adhesion promoters that are commonly used in PVC and CPVC adhesives may be employed in the practice of the present invention.

Preferred fillers low specific gravity hollow spheres (glass, ceramic, or synthetic, e.g., PVC), and include solid particulate inorganic fillers such as calcium carbonate, aluminum trihydrate, calcium sulfate, and crystalline silica.

Preferred colorants include dyes and pigments, such as titanium dioxide, carbon black, aluminum Lake based-orange, and conventional red or yellow colorants.

Preferred thixotropic agents include fumed silica and precipitated silica (e.g., AEROSIL-200 available from Degussa Corporation, Cab-O-Sil MS available from Cabot Corporation, and HISIL T600) and treated bentonite clay (e.g., Bentone 27), and these may be used at low levels to obtain optimum flow properties, especially with regard to controlling spillage from the pipe upon application.

Preferred stabilizers include such additives as acid scavengers, antioxidants (e.g., hindered phenols) and tin stabilizers.

Preferred rheology additives include non-PVC or non-CPVC thermoplastic resins, such as one or more of thermoplastic PVC polymers (in the case of CPVC adhesives), acrylic polymers (in the case of CPVC adhesives), MBS polymers, ABS polymers, linear and core/shell polymers, and random and block polymers including elastomeric and rubber resins.

The blended mixture yields PVC or CPVC pipe adhesives that:
(1) result in low VOC formulas (e.g., less than 510 g/l for PVC pipe and less than 490 g/l for CPVC pipe);
(2) are very economical in the industry;
(3) yield strong, quick setting, durable pipe joints that meet the required standards and performance criteria (e.g., ASTM D-2564 lap shear for PVC);
(4) yield stable, low viscosity solutions that can be readily adjusted with thixotropes (e.g., Aerosil 200) to give desirable flow characteristics and body to adhesives, as well as primers for solvent welding PVC and CPVC pipe and components; and
(5) can be formulated with minimal (10 wt % maximum) or no (0 wt %) cyclic ethers such as THF.

A number of different, specific composition ranges are preferred. These include:
(a) about 5 to 25 wt % PVC resin;
about 5 to 50 wt % DMPD; and
about 10 to 68 wt % acetone.
(b) about 5 to 25 wt % PVC resin;
about 5 to 50 wt % DMPD;
about 10 to 68 wt % acetone; and
up to about 10 wt % tetrahydrofuran.
(c) about 5 to 25 wt % PVC resin;
about 5 to 50 wt % DMPD;
about 10 to 68 wt % acetone; and
up to about 50 wt % MEK, where acetone and MEK together total about 10 to 68 wt % of the adhesive.
(d) about 5 to 25 wt % PVC resin;
about 5 to 50 wt % DMPD;
about 10 to 68 wt % acetone; and
up to about 35 wt % cyclohexanone, where acetone and cyclohexanone together total about 10 to 68 wt % of the adhesive.
(e) about 5 to 25 wt % PVC resin;
about 5 to 50 wt % DMPD;
about 10 to 68 wt % acetone; and
up to about 35 wt % of at least one of MPK and DEK, where acetone, MPK, and DEK together total about 10 to 68 wt % of the adhesive.
(f) about 5 to 25 wt % PVC resin;
about 5 to 50 wt % DMPD;
about 10 to 68 wt % acetone; and
up to about 35% of at least one of cyclohexanone, MPK, and DEK, where acetone, MPK, DEK, and cyclohexanone together total about 10 to 68 wt % of the adhesive.
(g) about 5 to 25 wt % PVC resin or CPVC resin;
about 5 to 50 wt % DMPD; and
about 10 to 68 wt % methyl ethyl ketone.
(h) about 5 to 25 wt % PVC resin or CPVC resin;
about 5 to 50 wt % DMPD;
about 10 to 68 wt % methyl ethyl ketone; and
up to about 10 wt % THF.
(i) about 5 to 25 wt % PVC resin or CPVC resin;
about 5 to 50 wt % DMPD;
about 10 to 68 wt % methyl ethyl ketone; and up to about 35 wt % cyclohexanone, wherein methyl ethyl ketone and cyclohexanone together total about 10 to 68 wt % of the adhesive.
(j) about 5 to 25 wt % PVC resin or CPVC resin;
about 5 to 50 wt % DMPD;
about 10 to 68 wt % methyl ethyl ketone; and
up to about 35 wt % of at least one of MPK and DEK, wherein methyl ethyl ketone, MPK, and DEK together total about 10 to 68 wt % of the adhesive.
(k) about 5 to 25 wt % PVC resin or CPVC resin;

about 5 to 50 wt % DMPD;
about 10 to 68 wt % methyl ethyl ketone; and
up to about 35 wt % cyclohexanone, wherein methyl ethyl ketone, MPK, DEK, and cyclohexanone together total about 10 to 68 wt % of the adhesive.

It is noted that the PVC or CPVC resin may have a concentration as low as 5 wt %. Such a formulation is still an adhesive, but it falls below the minimum of 10 wt % required to satisfy ASTM compliance.

The formulations provided above, if the solids (PVC or CPVC resin and solid additives) are omitted, are primers, and may be used as such with both PVC and CPVC pipes.

Primers may be employed as part of a two-step process, comprising applying the primer to one or both surfaces of the pipes (or other objects) being joined, followed by applying the adhesive. The primer for joining PVC pipes and components or CPVC pipes and components comprises:

(a) 15 to 85 wt % dimethyl-2-piperidone;
(b) 10 to 75 wt % of at least one ketone selected from the group consisting of (1) 0 to about 75 wt % acetone, (2) 0 to about 75 wt % of at least one low boiling ketone having a boiling point less than 80° C., (3) 0 to about 35 wt % of at least one medium boiling ketone having a boiling point within a range of about 80° to 130° C., and (4) 0 to about 35 wt % of at least one high boiling ketone having a boiling point greater than 130° C., wherein said medium boiling ketone and said high boiling ketone have a maximum amount of 35 wt %; and
(c) 0 to about 10 wt % tetrahydrofuran.

EXAMPLES

Examples 1–6; Comparative Examples 1,2

The compositions listed in Table I below exemplify some typical preferred compositions with low VOC values. SCAQMD Rule 1168 specifies a VOC level for PVC adhesives of 510 g/l or less. In Examples 1–3, DMND and MEK adhesives result in acceptable VOC levels; in Examples 4–6, the DMPD and acetone formulas evidence much lower VOC levels as a result of acetone being an exempt compound. Comparative Examples 1 and 2 in Table II show VOC levels exceeding 500 g/l for a typical THF/resin adhesive (Comparative Example 1) and for a typical commercial cement Weld-On 711 (Comparative Example 2). The viscosity for Examples 1–6 in Table I also exemplify the low values of these DMPD base adhesives, which are commercially desirable, since they can be readily increased using thixotropic agents such as fumed silica or rheology additives such as homo-, co-, or ter-polymeric methacrylate, MBS (methyl methacrylate-butadiene-styrene), ABS (acrylonitrile-butadiene-stryene), etc. to give desirable flow characteristics and body to the adhesives.

TABLE I

Compositions and Results for Examples 1–6.

| Ingredients | 1 | 2 | 3 | 4 | 5 | 6 |
|---|---|---|---|---|---|---|
| MEK | — | 44.00 | 66.00 | — | — | 24.00 |
| Cyclohexanone | — | — | — | — | — | 15.00 |
| Acetone | — | — | — | 44.00 | 66.00 | 24.00 |
| Dimethyl piperidone | 90.00 | 44.00 | 22.00 | 44.00 | 22.00 | 25.00 |
| SE-650 PVC resin (I.V. = 0.68) | 10.00 | 12.00 | 12.00 | 12.00 | 12.00 | 12.00 |
| Total | 100.00 | 100.00 | 100.00 | 100.00 | 100.00 | 100.00 |
| Viscosity (cps) | 175 | 70 | 60 | 60 | 120 | 60 |
| Spindle/Speed | 2@60 | 2@60 | 2@60 | 2@60 | 2@60 | 2@60 |
| Specific Gravity | 1.024 | 0.937 | 0.891 | 0.931 | 0.883 | 0.916 |
| VOC/SCAQMD method# 316-A (Rev 04/95) (max: 510 g/l) | 235 | 461 | 483 | 298 | 197 | 375 |
| Hydrostatic Burst Strength per ASTM D-2564 (min. req'd: 400 psi) | | Passed | Passed | Passed | Passed | Passed |

TABLE II

Compositions and VOC and Lap Shear Strength for Comparative Examples 1 and 2.

| Ingredients | Comparative Example 1 | Comparative Example 2 |
|---|---|---|
| THF | 80.50 | A typical |
| Cyclohexanone | — | PVC |
| Cyclohexanone | — | cement, |
| Acetone | — | Weld-On#711 |
| Dimethyl piperidone | — | — |
| SE-650 PVC resin (I.V. = 0.68) | 19.50 | PVC |
| Total | 100.00 | |
| Viscosity (cps) | 500 | |
| Spindle/Speed | 2@30 | |
| VOC/SCAQMD method# 316-A(Rev 04/95) | 528 | 600 |
| Lap Shear Strength Avg per ASTM D-2564 Time: 2 hrs. Min. Req'd: 250 psi | 288 | Pass |
| Lap Shear Strength Avg per ASTM D-2564 Time: 16 hrs. Min. Req'd: 500 psi | 673 | Pass |
| Lap Shear Strength Avg per ASTM D-2564 Time: 72 hrs. Min. Req'd: 900 psi | 1391 | Pass |

Examples 7–15

The compositions listed in Table III exemplify the wide latitude in formulation with based adhesives with respect to adhesive performance. Formulas of DMPD with acetone (Examples 7, 8, 11, 13); DMPD with acetone, MEK, and cyclohexanone (Example 9); DMPD with MEK and cyclohexanone (Example 12); and DMPD and MEK (Example 15) all satisfy the minimum lap shear values for 2, 16, and 72 hours as required in ASTM D-2564 for PVC.

TABLE III

Compositions and Lap Shear Strength/ASTM-D2564 for Examples 7–15.

| Ingredients | | 7 | 8 | 9 | 10 | 11 | 12 | 13 | 14 | 15 |
|---|---|---|---|---|---|---|---|---|---|---|
| MEK | | — | — | 23.50 | — | — | 47.00 | — | — | 60.00 |
| Cyclohexanone | | — | — | 15.00 | 15.00 | — | 15.00 | — | — | — |
| Acetone | | 68.00 | 45.00 | 23.50 | 47.00 | 60.00 | — | 45.00 | 43.50 | — |
| Dimethyl Piperidone | | 22.00 | 45.00 | 25.00 | 25.00 | 30.00 | 25.00 | 45.00 | 43.50 | 30.00 |
| SE-650 PVC resin (I.V. = 0.68) | | 10.00 | 10.00 | 13.00 | 13.00 | 10.00 | 13.00 | — | 13.00 | 10.00 |
| SE-950 PVC resin (I.V. = 0.92) | | — | — | — | — | — | — | 10.00 | — | — |
| Total | | 100.00 | 100.00 | 100.00 | 100.00 | 100.00 | 100.00 | 100.00 | 100.00 | 100.00 |
| Viscosity (cps) | | 75 | 40 | 95 | 90 | 35 | 95 | 120 | 90 | 45 |
| Spindle/Speed | | 2@60 | 2@60 | 2@60 | 2@60 | 2@60 | 2@60 | 2@60 | 2@60 | 2@60 |
| C.S. Strength Time: 2 Hrs. Substrate: PVC Wipe W/:MEK | Avg | 358 | 308 | 286 | 297 | 311 | 269 | 289 | 334 | 350 |
| C.S. Strength Time: 16 Hrs. Substrate: PVC Wipe W/: MEK | Avg | 846 | 661 | 603 | 576 | 573 | 503 | 558 | 566 | 632 |
| C.S. Strength Time: 72 Hrs. Substrate: PVC Wipe W/: MEK | Avg | 1480 | 1178 | 975 | 913 | 1355 | 925 | 949 | 1029 | 1148 |
| Hydrostatic Burst Strength per ASTM D-2364 (min. req'd: 400 psi | | Passed | Passed | Passed | Passed | Passed | Passed | Passed | Passed | Passed |

Examples 7–15 clearly demonstrate to one skilled in the art that various changes and modifications may be used to adjust set-time, viscosity, VOC levels, bond strength and formulations costs and such changes and modifications are considered to fall within the scope of the invention. Likewise, one skilled in the art easily recognizes that these DMPD formulations can be made to include other known PVC and CPVC solvents such as THF, NMP, aliphatic and aromatic ketones to further adjust desired adhesive properties. Likewise, formulation comprising various molecular weight thermoplastic PVC and CPVC with DMPD blends would be obvious to one skilled in the art as exemplified in Example 13.

Examples 16–19

Table IV below lists the solution properties of adhesives containing PVC resins having I.V. values ranging from 0.68 to 0.90.

TABLE IV

Compositions and Results for Examples 16–19.

| | 16 | 17 | 18 | 19 |
|---|---|---|---|---|
| Dimethyl piperidone | 90.00 | 90.00 | 90.00 | 90.00 |
| SE-650 PVC resin (I.V. = 0.68) | 10.00 | — | — | — |
| SE-750 PVC resin (I.V. = 0.74) | — | 10.00 | — | — |
| SE-800 PVC resin (I.V. = 0.78) | — | — | 10.00 | — |
| SE-950 PVC resin (I.V. = 0.90) | — | — | — | 10.00 |
| Total | 100.00 | 100.00 | 100.00 | 100.00 |
| Viscosity (cps) | 175 | 225 | 255 | 405 |
| Spindle/Speed | 2@60 | 2@60 | 2@60 | 2@60 |
| Specific Gravity | 1.024 | 1.024 | 1.025 | 1.025 |

Table IV illustrates that DMPD readily dissolves various PVC resins (of different I.V.) to give 10 wt % solutions with low viscosities. This is meant to show that cements can be formulated with a range of PVC molecular weights (based on I.V. value). While the DMPD concentration is higher than discussed earlier, it is listed here to show that although such compositions are very slow drying, nevertheless, the compositions are still good adhesives.

ASTM F-656 requires that a solvent/solvent blend is a primer if it can dissolve 10 wt % resin.

Examples 20–23

Table V below lists the hydrostatic burst strength of adhesives containing CPVC resins. The hydrostatic burst strengths were measured in accordance with ASTM-F493.

TABLE V

Compositions and Results for Examples 20–23.

|  |  | 20 | 21 | 22 | 23 |
|---|---|---|---|---|---|
| MEK |  | 60.00 | 43.00 | — | — |
| Acetone |  | — | — | 60.00 | 43.00 |
| Dimethyl piperidone |  | 26.00 | 43.00 | 26.00 | 43.00 |
| BFG - 677x670 CPVC resin |  | 14.00 | 14.00 | 14.00 | 14.00 |
| Total |  | 100.00 | 100.00 | 100.00 | 100.00 |
| Viscosity (cps) |  | 175 | 225 | 255 | 405 |
| Spindle/Speed |  | 2@60 | 2@60 | 2@60 | 2@60 |
| Specific Gravity |  | 1.024 | 1.024 | 1.025 | 1.025 |
| Hydrostatic Burst | 1 | 550 | 400 | 450 | 425 |
| Pressure per ASTM | 2 | 550 | 425 | 425 | 400 |
| F-493 | 3 | 550 | 400 |  |  |
| Test Temp.: R.T. | Avg. | 550 | 408 | 438 | 413 |
| Min. Req'd: 400 psi |  |  |  |  |  |
| Hydrostatic Burst | 1 | 360 | 310 | 300 | 310 |
| Pressure per ASTM | 2 | 340 | 350 | 310 | 290 |
| F-493 | 3 |  | 310 | 290 | 290 |
| Test Temp.: 180° F. water | Avg. | 350 | 323 | 300 | 297 |
| Min. Req'd: 200 psi |  |  |  |  |  |

Table V lists some specific examples of CPVC low VOC cement formulations containing DMPD, MEK, and acetone. These formulations show the solvency of DMPD/MEK/acetone combinations and their effectiveness as CPVC cements. It would be obvious to one skilled in this art that other solvent blends of DMPD/MEK/acetone and other ketones such as DEK, cyclohexanone, etc., as well as formulas with minimal amounts of THF, lend themselves as cements for CPVC articles such as pipes, fittings, etc.

INDUSTRIAL APPLICABILITY

The adhesives and primers disclosed herein are expected to find use in joining PVC and CPVC pipes and other such articles together.

Thus, there have been disclosed PVC and CPVC adhesives and primers. It will be readily apparent to those skilled in this art that various changes and modifications of an obvious nature may be made, and all such changes and modifications are considered to fall within the scope of the present invention, as defined by the appended claims.

What is claimed is:

1. An adhesive for joining PVC pipes and components or CPVC pipes and components comprising either:
   (a1) about 5 to 25 wt % PVC resin and 0 to about 25 wt % acrylic resin, the total of said PVC resin and acrylic resin ranging from 10 to 35 wt %; or
   (a2) about 5 to 25 wt % CPVC resin; and
   (b) 5 to 80 wt % dimethyl-2-piperidone;
   (c) 10 to 75 wt % of at least one ketone selected from the group consisting of (1) 0 to about 75 wt % acetone, (2) 0 to about 75 wt % of at least one low boiling ketone having a boiling point less than 80° C., (3) 0 to about 35 wt % of at least one medium boiling ketone having a boiling point within a range of about 80° to 130° C., and (4) 0 to about 35 wt % of at least one high boiling ketone having a boiling point greater than 130° C., wherein said medium boiling ketone and said high boiling ketone have a maximum amount of 35 wt %; and
   (d) 0 to about 10 wt % tetrahydrofuran.

2. The adhesive of claim 1 comprising said PVC resin, wherein said PVC resin has an inherent viscosity within a range of 0.6 to 0.95.

3. The adhesive of claim 1 comprising said PVC resin, wherein said acrylic resin comprises a homopolymer, a copolymer or a terpolymer of methyl methacrylate having an inherent viscosity ranging from 0.1 to 1.25 or a melt flow index ranging from 1.6 to 24.

4. The adhesive of claim 1 comprising said CPVC resin, wherein said CPVC resin has an inherent viscosity within a range of 0.6 to 0.85 and a chlorination within a range of 50 to 80 wt %.

5. The adhesive of claim 1 further comprising a filler selected from the group consisting of hollow ceramic spheres, hollow glass spheres, hollow synthetic spheres, calcium carbonate, alumina trihydrate, calcium sulfate, and crystalline silica.

6. The adhesive of claim 1 further comprising a thixotropic agent selected the group consisting of fumed silica, precipitated silica, and treated bentonite clay.

7. The adhesive of claim 1 wherein said low boiling ketone consists essentially of methyl ethyl ketone.

8. The adhesive of claim 1 wherein said at least one medium boiling ketone is selected from the group consisting of diethyl ketone, methyl propyl ketone, methyl iso-propyl ketone, methyl iso-butyl ketone, and methyl n-butyl ketone.

9. The adhesive of claim 1 wherein said at least one high boiling ketone is selected from the group consisting of cyclohexanone, acetophenone, methyl amyl ketone, methyl iso-amyl ketone, di-iso-butyl ketone, and ethyl amyl ketone.

10. The adhesive of claim 1 comprising:
   (a) about 5 to 25 wt % PVC resin;
   (b) about 5 to 50 wt % dimethyl-2-piperidone; and
   (c) about 10 to 68 wt % acetone.

11. The adhesive of claim 10 further comprising up to about 10 wt % tetrahydrofuran.

12. The adhesive of claim 10 further comprising up to 50 wt % methyl ethyl ketone, where acetone and methyl ethyl ketone together total about 10 to 68 wt % of said adhesive.

13. The adhesive of claim 10 further comprising up to about 35 wt % cyclohexanone, where acetone and cyclohexanone together total about 10 to 68 wt % of said adhesive.

14. The adhesive of claim 10 further comprising up to about 35 wt % of at least one of methyl propyl ketone and diethyl ketone, where acetone, methyl propyl ketone, and diethyl ketone together total about 10 to 68 wt % of said adhesive.

15. The adhesive of claim 14 further comprising up to about 35% cyclohexanone, where acetone, methyl propyl ketone, diethyl ketone, and cyclohexanone together total about 10 to 68 wt % of said adhesive.

16. The adhesive of claim 1 comprising:
   (a) about 5 to 25 wt % PVC resin or CPVC resin;
   (b) about 5 to 50 wt % dimethyl-2-piperidone; and
   (c) about 10 to 68 wt % methyl ethyl ketone.

17. The adhesive of claim 16 further comprising up to about 10 wt % tetrahydrofuran.

18. The adhesive of claim 16 further comprising up to about 35 wt % cyclohexanone, wherein methyl ethyl ketone and cyclohexanone together total about 10 to 68 wt % of said adhesive.

19. The adhesive of claim 16 further comprising up to about 35 wt % of at least one of methyl propyl ketone and diethyl ketone, wherein methyl ethyl ketone, methyl propyl ketone, and diethyl ketone together total about 10 to 68 wt % of said adhesive.

20. The adhesive of claim 19 further comprising up to about 35 wt % cyclohexanone, wherein methyl ethyl ketone, methyl propyl ketone, diethyl ketone, and cyclohexanone together total about 10 to 68 wt % of said adhesive.

21. A primer for joining PVC pipes and components or CPVC pipes and components comprising:
   (a) 15 to 85 wt % dimethyl-2-piperidone;
   (b) 10 to 75 wt % of at least one ketone selected from the group consisting of (1) 0 to about 75 wt % acetone, (2) 0 to about 75 wt % of at least one low boiling ketone having a boiling point less than 80° C., (3) 0 to about 35 wt % of at least one medium boiling ketone having a boiling point within a range of about 80° to 130° C., and (4) 0 to about 35 wt % of at least one high boiling ketone having a boiling point greater than 130° C., wherein said medium boiling ketone and said high boiling ketone have a maximum amount of 35 wt %; and
   (c) 0 to about 10 wt % tetrahydrofuran.

22. The primer of claim 21 wherein said at least one low boiling ketone consists essentially of methyl ethyl ketone.

23. The primer of claim 21 wherein said at least one medium boiling ketone is selected from the group consisting of diethyl ketone, methyl propyl ketone, methyl iso-propyl ketone, methyl butyl ketone, and methyl iso-butyl ketone.

24. The primer of claim 21 wherein said at least one high boiling ketone is selected from the group consisting of cyclohexanone, acetophenone, methyl amyl ketone, methyl iso-amyl ketone, di-iso-butyl ketone, and ethyl amyl ketone.

25. A method for reducing VOC emissions in adhesives for joining PVC pipes and components or CPVC pipes and components, said method comprising mixing together either (a) about 5 to 25 wt % PVC resin and 0 to about 25 wt % acrylic resin, the total of said PVC resin and acrylic resin ranging from 10 to 35 wt %, or (b) about 5 to 25 wt % CPVC resin; plus 5 to 80 wt % dimethyl-2-piperidone; 10 to 75 wt % of at least one ketone selected from the group consisting of (1) 0 to 75 wt % acetone, (2) 0 to 75 wt % of at least one low boiling ketone having a boiling point less than 80° C., (3) 0 to 35 wt % of at least one medium boiling ketone having a boiling point within a range of about 80° to 130° C., and (4) 0 to 35 wt % of at least one high boiling ketone having a boiling point greater than 130° C., wherein said medium boiling ketone and said high boiling ketone have a maximum amount of 35 wt %; and 0 to about 10 wt % tetrahydrofuran.

* * * * *